(12) United States Patent
Cornwall

(10) Patent No.: US 10,396,903 B2
(45) Date of Patent: Aug. 27, 2019

(54) METHOD FOR SENDING SIGNALS

(71) Applicant: Remi Oseri Cornwall, London (GB)

(72) Inventor: Remi Oseri Cornwall, London (GB)

( * ) Notice: Subject to any disclaimer, the term of this patent is extended or adjusted under 35 U.S.C. 154(b) by 0 days.

(21) Appl. No.: 15/578,330

(22) PCT Filed: May 27, 2016

(86) PCT No.: PCT/GB2016/051547
§ 371 (c)(1),
(2) Date: Nov. 30, 2017

(87) PCT Pub. No.: WO2016/193683
PCT Pub. Date: Dec. 8, 2016

(65) Prior Publication Data
US 2018/0152249 A1    May 31, 2018

(30) Foreign Application Priority Data

Jun. 1, 2015   (GB) .................................. 1509397.4
Jun. 1, 2015   (GB) .................................. 1509398.2
Jun. 1, 2015   (GB) .................................. 1509399.0
Jun. 8, 2015   (GB) .................................. 1509841.1
Jun. 8, 2015   (GB) .................................. 1509842.9
(Continued)

(51) Int. Cl.
*H04B 10/70*      (2013.01)
*H04B 10/90*      (2013.01)
(Continued)

(52) U.S. Cl.
CPC ............ *H04B 10/70* (2013.01); *H04B 10/90* (2013.01); *G02B 5/30* (2013.01); *G02B 27/10* (2013.01)

(58) Field of Classification Search
CPC ........ H04B 10/70; H04B 10/90; G02B 27/10; G02B 5/30
(Continued)

(56) References Cited

U.S. PATENT DOCUMENTS

2003/0133714 A1* 7/2003 Gat ...................... H04L 9/0852
                                                    398/140
2004/0042715 A1* 3/2004 Linden .................. H04L 27/00
                                                    385/31
(Continued)

FOREIGN PATENT DOCUMENTS

WO      2006064248 A2      6/2006

OTHER PUBLICATIONS

International Search Report and Written Opinion for Application No. PCT/GB2016/051547 dated Sep. 28, 2016 (13 pages).

*Primary Examiner* — Juan A Torres
(74) *Attorney, Agent, or Firm* — Michael Best & Friedrich LLP

(57) ABSTRACT

An improved scheme for sending classical digital data over a quantum channel is presented using path entanglement. The protocol is can detect digital data by the measurement or non-measurement of one entangled channel to signal to the remote station. The remote station is able to resolve the distant measurement by use of an interferometer. No measurement and the entangled state imply an interference effect at the remote station, whereas measurement results in a mixed state and no interference. A disproof of the "No-communication Theorem" is presented. The method applies to both matter and light waves.

20 Claims, 7 Drawing Sheets

(30) Foreign Application Priority Data

| | | | |
|---|---|---|---|
| Jun. 8, 2015 | (GB) | ................................... | 1509843.7 |
| Jul. 17, 2015 | (GB) | ................................... | 1512641.0 |
| Jul. 17, 2015 | (GB) | ................................... | 1512642.8 |
| Jul. 17, 2015 | (GB) | ................................... | 1512643.6 |

(51) Int. Cl.
*G02B 5/30* (2006.01)
*G02B 27/10* (2006.01)

(58) Field of Classification Search
USPC ....................................................... 398/140
See application file for complete search history.

(56) References Cited

U.S. PATENT DOCUMENTS

2009/0097650 A1* 4/2009 Cornwall ............... H04B 10/70
380/256
2015/0055961 A1 2/2015 Meyers et al.

* cited by examiner

Figure 5c – 3-way splitter
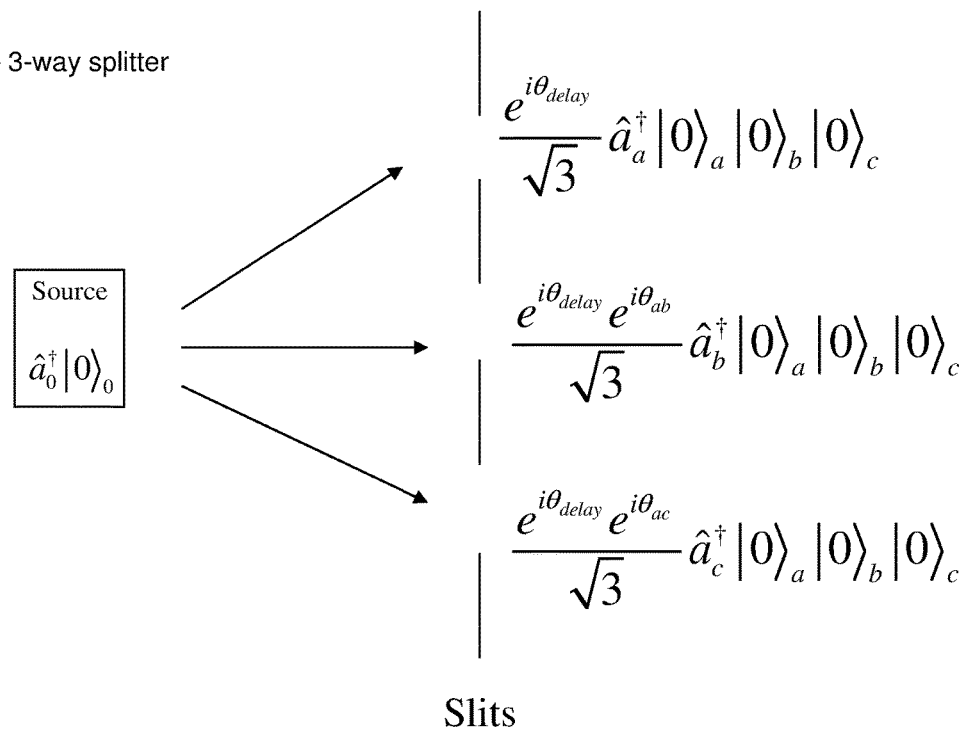
Slits
Figure 5d – N-way splitter
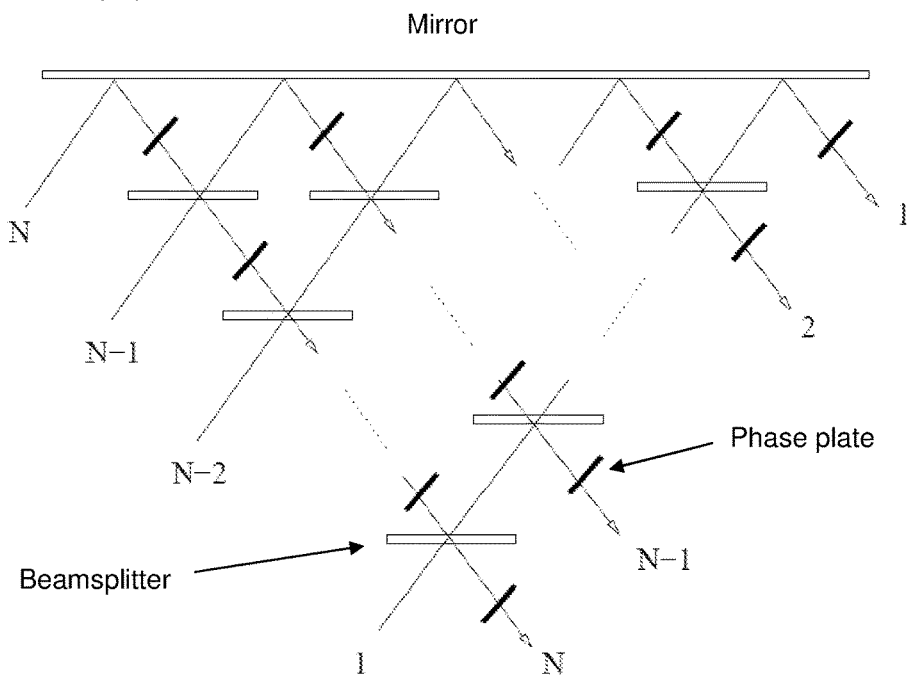

METHOD FOR SENDING SIGNALS

This document concerns improvements on a method of sending classical data down a quantum channel, as disclosed in international patent application no. PCT/GB05/004860.

In FIG. 1 the communications setup as disclosed in international patent application no. PCT/GB05/004860 shows how entangled photons emitted by a source 1 (S) are sent over a considerable distance (the break is donated by the two pairs of diagonal lines) to a modulating/absorbing gate 2 and an interferometer on the right hand side: first a polarising beam splitter 3 separates components into horizontal |H> and vertical components |V>. The Faraday rotators 4 and 5 rotate the two components to the diagonal basis where after reflecting off mirrors 6 (M), they interfere at the detector 7 (D).

It is an object of this application to provide an improved system and method of this type.

Accordingly, one aspect of the present invention provides an information transmission arrangement comprising: an information particle source, arranged to emit particles along a first path; a first beamsplitter, arranged on the first path, arranged to direct particles travelling along the first path along either a second path or a third path; a filter provided at a first location and selectively movable between an on-path position, wherein particles travelling along the second path will impinge on the filter, and an off-path position, wherein particle travelling along the second path will not impinge on the filter; a detection arrangement provided at a second location, wherein particles travelling along the third path will arrive at the second location; and a further source of particles arranged to direct particles to the second location, along a path that is different from the third path, such that particles travelling along the third path may interfere with particles from the further source of particles before arriving at the detector.

Advantageously, the further source of particles comprises particles from the information particle source.

Preferably, the further source of particles comprises a further beamsplitter which is arranged so that particles emitted from the information particle source impinge on the further beamsplitter.

Conveniently, particles emitted from the information particle source encounter the first beamsplitter before the further beamsplitter.

Advantageously, the reflection coefficient of the first beamsplitter is less than the reflection coefficient of the further beamsplitter.

Preferably, the transmission arrangement comprises first and second further beamsplitters, arranged so that particles emerging from the first beamsplitter impinge on one of the first and second further beamsplitters, and wherein: at each of the further beamsplitters, some particles are directed to the detector; the particles that are directed to the detector by the first and second further beamsplitters may interfere with each other before arriving at the detector; and particles from at least one of the further beamsplitters that are not directed to the detector are directed to the filter.

Conveniently, particles from the first and second further beamsplitters that are not directed to the detector are directed to respective first and second filters.

Advantageously, the particles emitted from the information particle source form a beam having a width, and wherein the first beamsplitter is arranged to occupy only a part of the width.

Preferably, particles in the beam that do not impinge on the first beamsplitter are directed to arrive at the detector.

Conveniently, particles that impinge on the first beamsplitter are directed along two paths, one of which is directed to the filter, and the other of which is directed to the detector.

Advantageously, the transmission arrangement further comprises a beam expander which increases the width of the beam.

Preferably, the further source of particles comprises a source which is separate from the information particle source.

Conveniently, the particles that are emitted from the further source of particles are of the same type as the particles that are emitted by the information particle source, and are coherent therewith.

Advantageously, the particles emitted by the information particle source are light waves or matter waves.

Preferably, the particles emitted by the information particle source are bosons or fermions.

Conveniently, the particles emitted by the information particle source are photons.

Advantageously, the coherence length of the particles that are emitted by the information particle source is greater than the difference between the path length to the detector of the two beams of particles from the information particle source that arrive at the detector.

Preferably, the filter is configured either to block all particles that impinge thereon, or only to allow particles having a certain value of a parameter to pass therethrough.

Another aspect of the present invention provides a method of transmitting information, comprising the steps of: providing a transmission arrangement according to any preceding claim; generating particles using the information particle source; placing the filter in the second path to communicate a first signal; not placing the filter in the second path to communicate a second signal; and monitoring the arrival of particles at the detector to interpret the first and second signals.

Conveniently, the first signal is one binary bit, and the second signal is the other binary bit.

Advantageously, the step of monitoring the arrival of particles at the detector comprises receiving a plurality of particles to comprise either the first signal or the second signal.

Preferably, the step of monitoring the arrival of particles at the detector comprises receiving a single particle to comprise either the first signal or the second signal.

Conveniently, the method comprises monitoring the arrival of particles at the detector over a series of agreed time slots, and wherein the number of particles that are detected as arriving at the detector during each time slot determines which of the first and the second signals are received.

In order that the present invention may be more readily understood, embodiments thereof will now be described, with reference to the accompanying drawings, in which:

FIG. 5c shows a 3-way splitter and the enumeration scheme made from a source and three slits.

FIG. 5d shows an N-way splitter made from beamsplitters and phase plates.

According to some embodiments of the present invention there is provided a means (FIGS. 4, 5, 6) of using one or two (non-entangled) coherent photon sources 9 with good coherence length and relative coherence, with beamsplitters 10 (non-polarising) sending out a communication beam ("Alice") with modulating gates 2 (and 2A) and a detection beam ("Bob") where the beams are convergent on a detector 7, to effect a communications device.

BACKGROUND

Previously in international patent application no. PCT/GB05/004860 an apparatus was devised to communicate by entangled wavefunction collapse. Extensive accounts are given of this in the following references:

[1] "Secure Quantum Communication and Superluminal Signalling on the Bell Channel", Remi Cornwall: see vixra.org abstracts
[2] "A Means to Purify an Entangled Source", Remi Cornwall: see vixra.org abstracts Further theoretical justification (including finding fault in the "no-communications theorems" of Profs. Michael Hall and Giancarlo Ghirardi[3-5]) is given in the following papers, though a more up-to-date view will be developed in this document.

Figure 1:
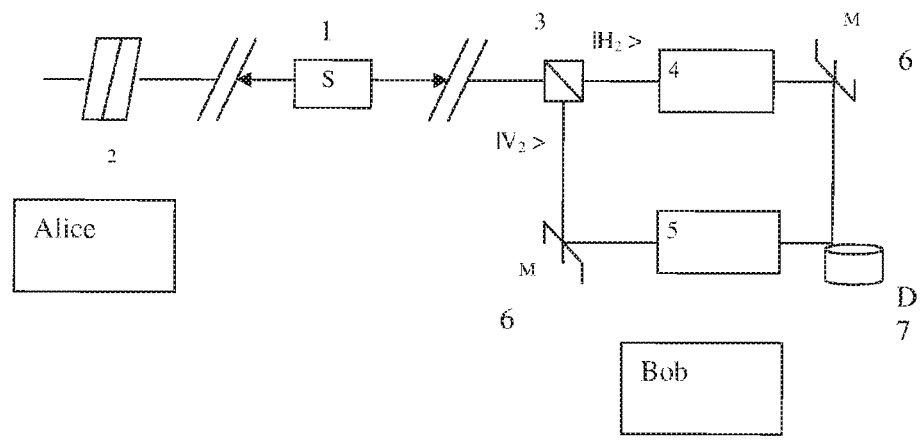
FIG. 1 shows the existing entangled communication scheme as disclosed in PCT/GB05/004860.
Figure 2:
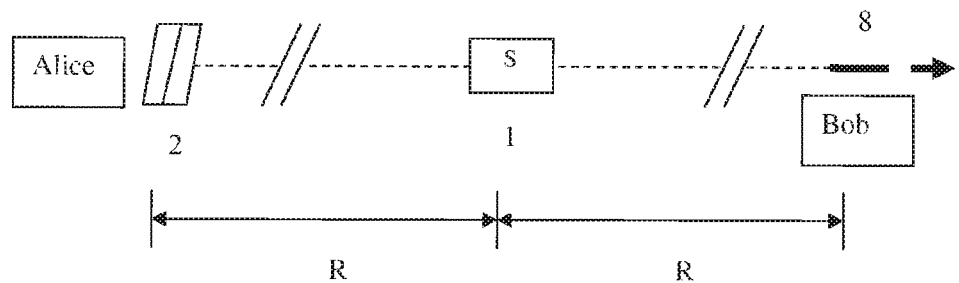
FIGS. 2 and 2a show the spatial arrangement of the left and right wavefunction and where the wavefunction is in entanglement superposition and where, after measurement, it is in the mixed state.

[6] "Is the Consequence of Superluminal Signalling to Physics Absolute Motion Through an Ether?", Remi Cornwall: see vixra.org abstracts
[7] "A Mechanism for the Effects of Relativity", Remi Cornwall: see vixra.org abstracts
[8] "Reply to Critique by Ghirardi of Entanglement Communication Scheme by Cornwall", Remi Cornwall: see vixra.org abstracts
[9] "How the Quantum no-Communication Theorem Misuses the Formalism and Loses Phase Information", Remi Cornwall: see vixra.org abstracts
[10] "Disproof of the no-Communication Theorem by Decoherence Theory", Remi Cornwall: see vixra.org abstracts FIG. 1 shows the existing scheme that uses a source to produce two polarised entangled photons in one of the Bell States. The two photons travel out some distance from the source in the entangled superposition state (FIG. 2), to Alice's modulation gate 2 (which can be a liquid crystal and polariser or anything else one skilled in the art would use) on the left-hand-side and Bob's interferometer setup on the right-hand-side: polarising beamsplitter 3, Faraday rotator 4 to rotate |H> to |D> diagonal basis, Faraday rotator 5 to rotate |V> to |D>, mirrors 6 and detector 7, If Alice measures 2 before Bob's photon is incident on his apparatus, the non-entangled, non-superposition mixed state will then pass through Bob's interferometer 8 (FIG. 2). The mixed state cannot interfere. Bob can discern whether Alice has made a measurement or not at the detector 7 since the non-measured state will be in entanglement superposition and then use both arms of the interferometer.

Figure 2A:
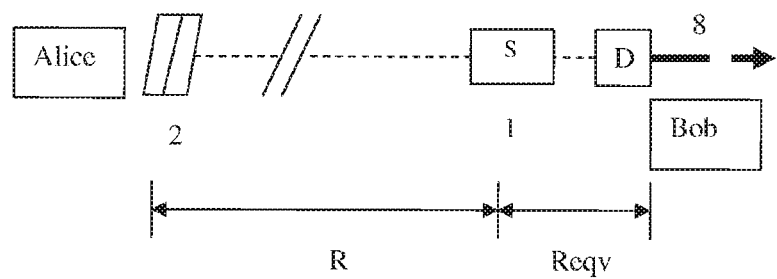

FIG. 2A shows a variation where Bob (or indeed Alice) doesn't have to be equidistant from the source due to the effect of a delay element D (such as a dielectric/high permeability medium) which effectively slows the photons down. $R_{eqv}$ is the distance the slowed photons travel in the equivalent time that Alice's photons travel the distance R/c (the speed of light).

Theory

We shall use Decoherence Theory[10] to elucidate holes in the "No-communication Theorem"[3-5]. Let us first consider how a state vector is extended for multi-particle systems:

$$\frac{1}{\sqrt{2}}(|H_1\rangle + |V_1\rangle) \otimes \frac{1}{\sqrt{2}}(|H_2\rangle + |V_2\rangle) = \qquad \text{eqn. 1}$$

$$\frac{1}{4}(|H_1\rangle|H_2\rangle + |H_1\rangle|V_2\rangle + |V_1\rangle|H_2\rangle + |V_1\rangle|V_1\rangle)$$

Here, for example, two photons in the diagonal basis are combined into one vector spanning both Hilbert spaces by the tensor product[11]. Such a system we call factorisable or separable and we'd expect no operation performed on subsystem 1 or 2 to affect the other. For instance, if system 1 is projected into the horizontal or vertical states, we'd factorise as, $$|H_1\rangle \otimes (|H_2\rangle + |V_2\rangle) \text{ or } |V_1\rangle \otimes (|H_2\rangle + |V_2\rangle)$$

thus leaving the other system unaffected.

However when a system is prepared subject to some conservation rule (in the following example with polarisation, the conservation of angular momentum and energy [12]), the possibilities for the product space are curtailed, giving the Bell States for instance. We might write, $$|H_1\rangle|H_2\rangle + 0 \pm 0 \pm |V_1\rangle|V_2\rangle$$

and realise that this cannot be factored, leading to the inescapable conclusion that a measurement on system will affect the other. However, with wavefunction collapse being a strictly indeterminate process[13, 14], projection into a state would not lead to certainty of that state (there is only certainty with repeated measurements if the state is not given sufficient time to evolve, the so-called "Quantum Zeno" principle), thus any communication scheme by distant measurement would seem to be thwarted by the randomness inherent in quantum measurement but a posteriori we could discern correlations by pooling experimental results[15] and comparing local and distant measurement events.

Let us now use the density matrix formalism and write the tensor product of our (for example) two particles system and the environment. The environment also will include the measurement apparatus, but we write before measurement:

$$\rho_{total} = |\text{start}\rangle\langle\text{start}| = |\psi\rangle\langle\psi| \otimes |e\rangle\langle e| \qquad \text{eqn. 2}$$

Our two component system is entangled and can't be separated but each particle has n states, $$\rho_{12} = |\psi\rangle\langle\psi| = \sum_{i,j=1,n^2} \psi_i \psi_j^* \qquad \text{eqn. 3}$$

To consider our two particle entangled system in isolation, we take the reduced trace which is defined as:

$$\rho_A = tr_B(\rho_{AB}) \quad \text{eqn. 4}$$

So for a two component system with any two vectors, we take the partial trace as:

$$tr_B(|a_1\rangle\langle a_2| \otimes |b_1\rangle\langle b_2|) = |a_1\rangle\langle a_2|tr(|b_1\rangle\langle b_2|)$$

$$= |a_1\rangle\langle a_2|\langle b_1 | b_2\rangle$$

So returning to our entangled system and the environment, the environment can be traced out thus:

$$\rho_{12} = tr_e(\rho_{total}) \quad \text{eqn. 5}$$

$$= |\psi_{12}\rangle\langle\psi_{12}| \otimes \langle e | e\rangle$$

$$= |\psi_{12}\rangle\langle\psi_{12}|$$

Our entangled system can evolve in isolation subject to unitary operators acting on each particle $U_1$ and $U_2$ respectively:

$$|\psi_{12}\rangle_{t+1} = (U_1 \otimes U_2)|\psi_{12}\rangle_t$$

or $$\rho_{12}|_{t+1} = (U_1 \otimes U_2)\rho_{12}|_t(U_1 \otimes U_2)^\dagger \quad \text{eqn. 6}$$

In particular, with reference to the entangled communication scheme of Cornwall[1], $U_2$ is Bob's interferometer apparatus and it can distinguish the pure entangled state of the entangled system.

Indeed, considering the expansion of $|\psi\rangle$ into its constituent basis, the transition probability can be written:

$$P(\psi_t \to \psi_{t+1}) = \langle\psi_{t+1}|\rho_{12}|\psi_{t+1}\rangle \quad \text{eqn. 7}$$

$$= \langle\psi_{t+1}|\psi_t\rangle\langle\psi_t|\psi_{t+1}\rangle$$

$$= \sum_{i=1,n^2} |\psi_{i,t}^*\psi_{i,t+1}|^2 + \sum_{\substack{i,j=1,n^2 \\ i \neq j}} \psi_{i,t}^*\psi_{j,t}\psi_{j,t+1}^*\psi_{i,t+1}$$

This clearly shows interference terms and thus a combination of diagonal and off-diagonal elements in the density matrix.

As the experiment ends, the entangled system begins to interact with the environment (that includes the measurement apparatus):

$$\rho_{total} = |end\rangle\langle end| \quad \text{eqn. 8}$$

$$= |\psi\rangle\langle\psi| \cdot |i\rangle\langle j| \otimes |e_i\rangle\langle e_j|$$

$$= \sum_{i,j=1,n^2} \psi_i\psi_j^*|i\rangle\langle j| \otimes |e_i\rangle\langle e_j|$$

The partial trace is taken again to isolate our two particle system:

$$\rho_{12} = tr_e(\rho_{total}) \quad \text{eqn. 9}$$

$$= \sum_{i,j=1,n^2} \psi_i\psi_j^*|i\rangle\langle j| \otimes \langle e_i | e_j\rangle$$

-continued $$= \sum_{i,j=1,n^2} \psi_i\psi_j^*|i\rangle\langle j|\delta_{ij}$$

$$= \sum_{i=1,n^2} |\psi_i|^2|i\rangle\langle i|$$

Once again we can compute the probability of transition but given the circumstance of interaction with the environment:

$$P(\psi_t \to \psi_{t+1}) = \langle\psi_{t+1}|\rho_{12}|\psi_{t+1}\rangle \quad \text{eqn. 10}$$

$$= \sum_{i,j=1,n^2} |\psi_{i,t}|^2|\psi_{i,t+1}|^2\langle j|i\rangle\langle i|j\rangle$$

$$= \sum_{i=1,n^2} |\psi_{i,t}^*\psi_{i,t+1}|^2$$

Comparing eqn. 10 to eqn. 7 we see the lack of interference terms and so quantum superpositions have given way to classical probabilities, when the system interacts with the environment. We note too that in eqn. 9, although the original system was entangled, that the diagonal density matrix indicates that our two particle system is now separable—that is, not entangled.

Initially we spoke of the entangled system evolving through the tensor product of two unitary operators:

$$|\psi_{12}\rangle_{t+1} = (U_1 \otimes U_2)|\psi_{12}\rangle_t$$

or $$\rho_{12}|_{t+1} = (U_1 \otimes U_2)\rho_{12}|_t(U_1 \otimes U_2)^\dagger$$

The decoherence analysis performed the evolution thus:

$$|\psi_{12}\rangle_{t+1} = (M_1 \otimes M_2)|\psi_{12}\rangle_t$$

$$\Rightarrow$$

$$M_1|\psi_1\rangle_{t+1} \text{ and } M_2|\psi_2\rangle_{t+1} \quad \text{eqn. 11}$$

That is, both particles interacted with the environment over the 2n basis vectors of the joint state vector, which then collapsed into two separable systems. This is also equivalent to:

$$|\psi_{12}\rangle_{t+1} = (M_1 \otimes U_2)|\psi_{12}\rangle_t$$

$$\Rightarrow$$

$$M_1|\psi_1\rangle_{t+1} \text{ and } U_2|\psi_2\rangle_{t+1} \quad \text{eqn. 12}$$

It is sufficient that only one measurement be performed—Alice can communicate to Bob via her measurement. Bob does a unitary transform with his interferometer and measures the resulting mixed state and not the pure, interfering, entangled state before her measurement. To see that this is so, that only one measurement is needed to decohere/de-entangle the two particle system, consider the tensor product of two state vectors (the coefficients have been left out):

$$(|e_1\rangle + |e_2\rangle + \ldots + |e_n\rangle) \otimes (|f_1\rangle + |f_2\rangle + \ldots + |f_n\rangle) = \quad \text{eqn. 13}$$

$$(|e_1\rangle|f_1\rangle + |e_1\rangle|f_2\rangle + \ldots + |e_1\rangle|f_n\rangle) + \ldots +$$

$$(|e_n\rangle|f_1\rangle + |e_n\rangle|f_2\rangle + \ldots + |e_n\rangle|f_n\rangle)$$

Although the product has $n^2$ terms, the density matrix in eqn. 8 has $n^4$ terms, as does the interaction matrix $|i\rangle\langle j|$, the form of each term $e_i f_j$ means that every term has a single particle interaction term and indeed, in the case of an entangled system, it isn't separable.

The end result is still the same: whether it is one or both entangled particles interacting, eqn. 9 shows the partial trace.

Important Disproof of No-Communication Theorem

Current wisdom ("No-communication theorem") believes that the act of taking the partial trace will leave both systems in a mixed state. Clearly from the above analysis this isn't so:

The scenario of unitary evolution and trace-out of the environment: eqn. 5, eqn. 6 and eqn. 7, allowed interference terms to be kept, Whilst the scenario of interaction with the environment (and trace-out of the environment): eqn. 8, eqn. 9 and eqn. 10 didn't.

In other words: It is not the act of taking the partial trace that causes the mixed state but the interaction with the environment. This interaction, through the loss of the interference terms, is obviously non-unitary. A non-unitary operation is synonymous with measurement.

New Method

In this description, the term photon is used but the results are applicable to bosons and fermions, photons and matter waves.

The discussion now moves onto the improvement in the scheme whereby a two photon entangled source doesn't have to have to be used. Entangled sources are expensive and produce entangled photon pairs with low efficiency. The new method benefits from using a standard laser coherent source.

In both cases: new and old method, the coherence length of the laser source must be greater than the difference in path length dimensions of "Bob's" interferometer (FIGS. 1, 3, 4, 5, 6 and 7). It is easy to see in FIGS. 2 and 2a that the photons moving away from the source are akin to ticker tape with the modulation/detection 2 of the entangled/measured and not entangled/mixed state/measured moving out at the speed of light (or the group velocity of the wave-packet). To discern these modulations, it is only necessary for the spatial size of these "bits" to be greater than difference in path length of the two arms of the interferometer, so that when the beams meet at the detector 7, modulation can be discerned.

Figure 3:
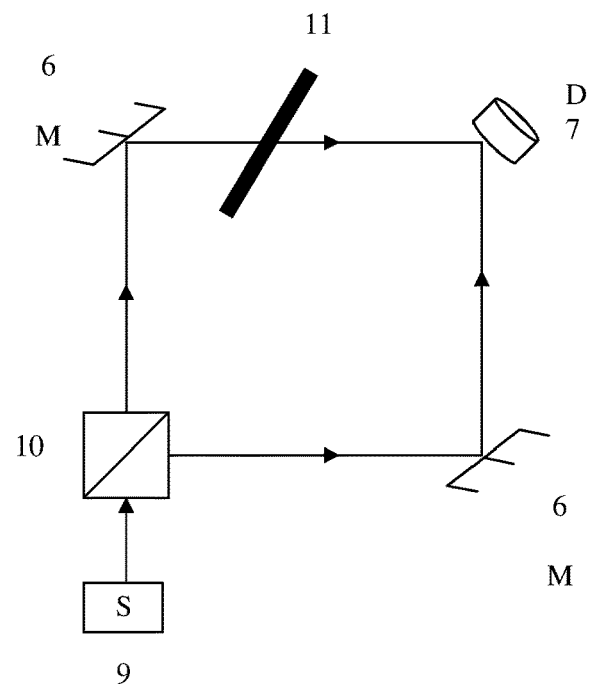
FIG. 3 shows an interferometer with a removable occlusion in one path.

By reference to FIG. 3, let us analyse a beamsplitter.

We can consider the beamsplitter 10 as a four port device[16, 17]. We show the source 9 only entering one port but the beam could enter via the left-hand-side. Let us call the input ports 1 and 2 and the output ports 3 and 4. To a good approximation, a beamsplitter is lossless and hence unitary, we write the evolution of electric fields (or magnetic as):

$$\begin{pmatrix} E_1 \\ E_2 \end{pmatrix} \rightarrow \begin{pmatrix} T & R \\ R & T \end{pmatrix} \begin{pmatrix} E_3 \\ E_4 \end{pmatrix} \qquad \text{eqn. 14}$$

Where the beamsplitter 2×2 matrix coefficients are complex numbers subject to the constraints:

$$|T|^2 + |R|^2 = 1$$

$$R^*T + RT^* = 0 \qquad \text{eqn. 15}$$

The reflected and transmitted intensities are given by $|R|^2$ and $|T|^2$ respectively. If we let $T=1$ and $R=|R|e^{i\theta}$, then a 50:50 beamsplitter can be represented by the matrix:

$$\frac{1}{\sqrt{2}} \begin{pmatrix} 1 & i \\ i & 1 \end{pmatrix} \qquad \text{eqn. 16}$$

Thus a reflected photon suffers a phase shift. Photon input at a port is represented by the creation operator associated with the port acting on the vacuum state. Thus we can write, respectively, for a photon at port 1 and then port 2 as[17]:

$$\hat{a}_1^\dagger |0\rangle = |1\rangle_1 |0\rangle_2$$

$$\hat{a}_2^\dagger |0\rangle = |0\rangle_1 |1\rangle_2 \qquad \text{eqn. 17}$$

Taking the first state in eqn. 17, this evolves through a 50:50 beamsplitter as:

$$|1\rangle_1|0\rangle_2 \rightarrow \psi_{out} = \frac{1}{\sqrt{2}}|1\rangle_3|0\rangle_4 + \frac{i}{\sqrt{2}}|0\rangle_3|1\rangle_4 \qquad \text{eqn. 18}$$

This shows path entanglement and a coherent superposition of the Fock states on both ports. The expectation measurement of the photon count at port 3 or 4 is:

$$\langle \hat{N}_3 \rangle = \psi_{out}^\dagger \hat{a}_3^\dagger \hat{a}_3 \psi_{out}$$

$$\langle \hat{N}_4 \rangle = \psi_{out}^\dagger \hat{a}_4^\dagger \hat{a}_4 \psi_{out} \qquad \text{eqn. 19}$$

This computes to ½. The joint expectation measurement $\omega_{out}^\dagger \hat{a}_3^\dagger \hat{a}_3 \hat{a}_4^\dagger \hat{a}_4 \psi_{out}$ is zero and shows that the photon cannot be at both ports. This reasoning follows for up to two photons at the input port, after that, in general, for higher photon numbers the outputs do not display path entanglement[16].

By reference to FIG. 3, let us analyse the interferometer.

It is clear by experiment and theory that the beamsplitter output of eqn. 18 can, by path length adjustment, be made to interfere constructively or destructively at the detector 7. The equation represents a coherent, superposition entangled state.

Proceeding analysis in eqn. 6, eqn. 11 and eqn. 12 has made clear that the single act of measurement (as indicated by the obstruction 11 in FIG. 3) will result in the mixed state (no interference terms) arising from eqn. 18 of:

$$\rho_{mixed} = \frac{1}{2}|1\rangle_3|0\rangle_{44}\langle 0|_3 \langle 1| + \frac{1}{2}|0\rangle_3|1\rangle_{44}\langle 1|_3 \langle 0| \qquad \text{eqn. 20}$$

Figure 4:
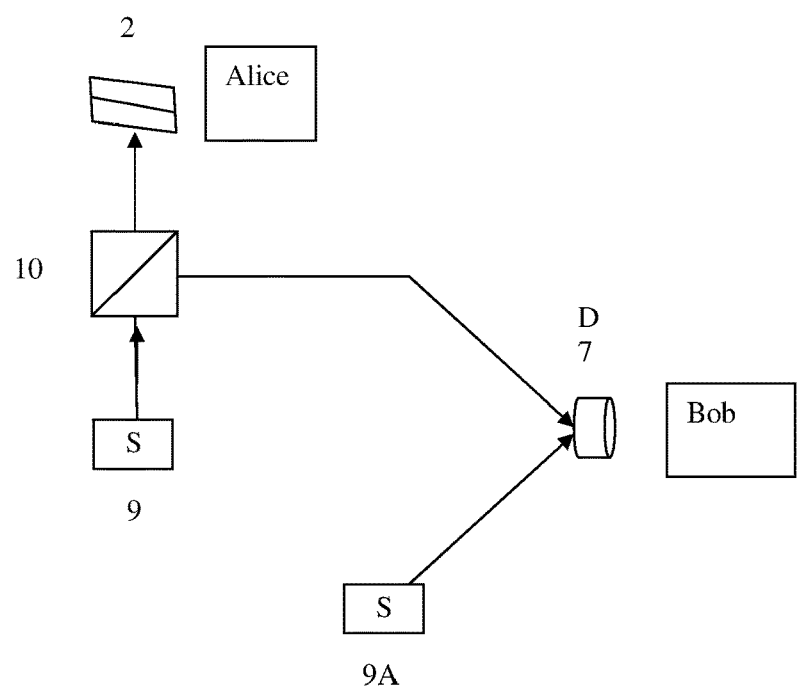
FIG. 4 shows one embodiment of the invention based on the interferometer and using two coherent sources.

By reference to FIG. 4, we now carry over the reasoning of FIG. 3 into the first embodiment of the invention using two identical, non-entangled coherent sources 9 (though source 9A is half the intensity for ease of argument) that have good relative coherence. It is clear that if "Alice" doesn't measure the wavefunctions at the detector will interfere (near zero signal if destructive interference) whilst if she doesn't, a "1" will result.

In this example, Alice may have a filter which she can either place in the path of the photons that reach her, so that the photons are blocked by the filter, or not place the filter in the path of the photons (in reality, it is likely that the apparatus at this location would comprise a filter that does not physically move in and out of the path, but is switched from a transparent state to a filtering state). We may say that Alice simply blocks photons that reach her when the filter is on-path, or that she "measures" the photons reaching her, by determining whether or not a photon interacts with the filter.

Measurement by Alice is not essential, however, as Alice is transmitting information to Bob.

The photons emitted by the first particle source 9 initially travel along a first path and arrive at the beamsplitter 10 (which is preferably a 50:50 beamsplitter), and the wavefunction of each photon will be split into two portions. One of these portions is directed along a second path to arrive at the filter 2. The other portion of the wavefunction will be directed along a third path to arrive at the detector 7.

If Alice does not place the filter in the path of this portion of the wavefunction, the position of each photon will remain in an indeterminate state. Alternatively, if Alice does place the filter in the path of this portion of the wavefunction, the position of each photon will be determined (i.e. whether the photon has travelled along the second path or the third path).

The setup is arranged so that the distance from the beamsplitter 10 to the filter 2 is less than the distance from the beamsplitter 10 to the detector 7. It should be understood that this "distance" relates to optical path length, which may be varied in any suitable way, and need not relate to simple physical distance. Therefore, of the two portions of the wavefunction that leave the beamsplitter 10, the portion that travels along the second path reaches the filter 2 before the portion that travels along the third path reaches the detector 7.

Thus, by choosing whether to place the polarising filter 2 on path or not, Alice can control whether a wavefunction arrives at the detector 7 representing a particle in an indeterminate position (if the filter is off-path) or whether photons having determined positions arrive at the detector 7 (if the filter is on-path).

A second particle source 9A emits particles which are directed and/or guided to arrive at the detector 7. The incoming paths to the detector 7 from the beamsplitter 10 and the second particle source 9A are combined (for example, by using mirrors and/or half-silvered mirrors, in a manner that will be understood by the skilled reader) so that these incoming paths are aligned or substantially aligned.

The particles emitted by the second particle source 9A are of the same type as those emitted by the first particle source 9, and are coherent with these particles.

If the polarising filter 2 is not placed on-path, then (as discussed above) the wavefunction arriving at the detector 7 from the beamsplitter 10 will represent a particle having an indeterminate position. A similar wavefunction will also arrive at the detector 7 from the second particle source 9A. The relative lengths of the paths to the detector 7 from the first and second particle sources 9, 9A are preferably such that the wavefunctions arriving from the beamsplitter 10 and the second particle source 9A will interfere destructively with each other, and no particle will be detected by the detector 7. Under one possible communications protocol, if the polarising filter 2 is off-path, this signals a binary zero from Alice to Bob.

Conversely, if the filter 2 is placed on-path, then half (in the case of a 50:50 beamsplitter) of the particles emitted by first source 9 will be reflected by the beamsplitter and arrive at the detector 7 having a specific, determined position. In this case, there cannot be any destructive interference with the wavefunctions arriving from the second source 9A, and so the detector 7 will detect the arrival of a particle. Under the possible communications protocol, if the polarising filter 2 is on-path, this signals a binary one from Alice to Bob.

Figure 5:
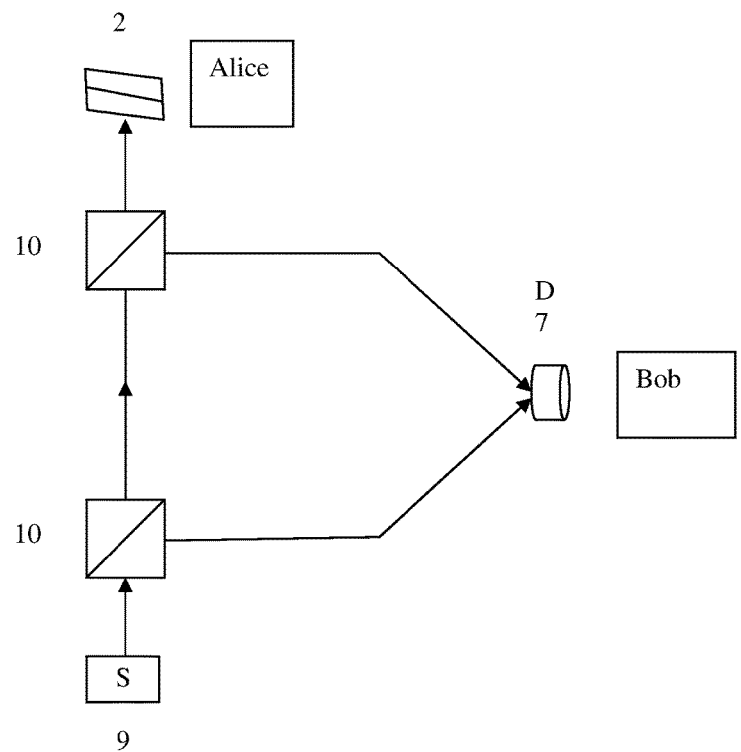
FIG. 5 shows another embodiment of the invention using one coherent source and two beamsplitters.

FIG. 5 shows another embodiment of the invention to work around the difficulty of keeping two independent sources in coherent synchronisation; one source of non-entangled coherent 9 passes through two beamsplitters 10. Advantageously the reflectivity and transmissivity of the pair can be arranged so that the reflected beams are of equal intensity or otherwise. The previous argument used for FIG. 4 is the same here, as regards the signal at the detector and measurement.

Figure 5A:
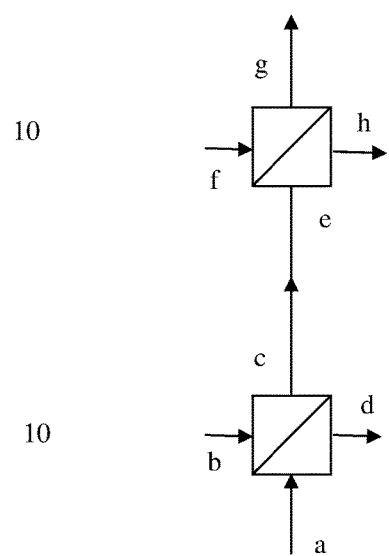
FIG. 5a shows an enumeration scheme for input and output ports for the two beamsplitters of FIG. 5.

Let us analyse this:

FIG. 5a shows the enumeration scheme for the input and output ports for two sequential beamsplitters. We know that the transmittivity matrix will transform creation operators [17] at input port "a" to creation operators at output ports "c" and "d" thus (for a 50-50 beamsplitter):

$$\hat{a}_a^\dagger |0\rangle_a |0\rangle_b \to \frac{1}{\sqrt{2}}(\hat{a}_c^\dagger + i\hat{a}_d^\dagger)|0\rangle_c |0\rangle_d = \frac{1}{\sqrt{2}}(|1\rangle_c |0\rangle_d + i|0\rangle_c |1\rangle_d) \quad \text{eqn. 21}$$

Figure 5B:
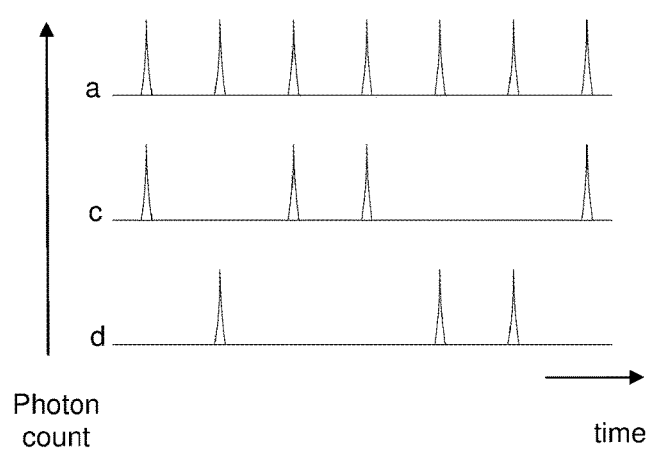
FIG. 5b shows a distribution of photons across some of the output ports shown in FIG. 5a and the introduction of "vacuum noise".

The output is entangled (non-factorisable) and so the states are in coherent superposition. Referencing FIG. 5b, we can see that a sub-Poissonian/non-classical light source producing single photons (a "photon gun") at port "a" will upon detection of the outputs "c" and "d" have the photons randomly distributed across both output ports. In the parlance of the state vector approach, we might write the combined output state vector after measurement (each output port incident on separate detectors) as:

$$\psi_{cd} = \frac{1}{\sqrt{2}}(|1\rangle_c |0\rangle_d + e^{i\theta(t)}|0\rangle_c |1\rangle_d) \quad \text{eqn. 22}$$

Where $\theta(t)$ is a random phase and random in time. Clearly the output of the detectors cannot coherently interfere. The density matrix treatment gives essentially the same reading:

$$|\psi_{cd}\rangle\langle\psi_{cd}| = \begin{pmatrix} \frac{1}{2} & \frac{1}{2}e^{-i\theta(t)} \\ \frac{1}{2}e^{i\theta(t)} & \frac{1}{2} \end{pmatrix} \quad \text{eqn. 23}$$

The off-diagonal elements show the level of coherence and on the time-scale of the measurement, with the $\theta(t)$ term varying very fast, there is no interference.

Moving onto concatenated beamsplitters, the output state vector is spanned by the tensor product of all the output ports, such that a photon present at port "a" is transformed thus:

$$\hat{a}_a^\dagger |0\rangle_c |0\rangle_d \to \frac{1}{\sqrt{2}}\left(\frac{1}{\sqrt{2}}(\hat{a}_g^\dagger + i\hat{a}_h^\dagger) + i\hat{a}_d^\dagger\right)|0\rangle_c |0\rangle_d |0\rangle_g |0\rangle_h = \quad \text{eqn. 24}$$

$$\frac{1}{\sqrt{4}}|0\rangle_c |0\rangle_d |1\rangle_g |0\rangle_h +$$

$$\frac{i}{\sqrt{4}}|0\rangle_c |0\rangle_d |0\rangle_g |1\rangle_h + \frac{i}{\sqrt{2}}|0\rangle_c |1\rangle_d |0\rangle_g |0\rangle_h$$

If three detectors are placed at output ports "d", "g" and "h" the probability of detection, by Born's rule for distinguishable paths, would be:

$$P(\text{photon}) = \left|\frac{i}{\sqrt{2}}\right|^2 + \left|\frac{1}{\sqrt{4}}\right|^2 + \left|\frac{i}{\sqrt{4}}\right|^2 \quad \text{eqn. 25}$$

-continued $$= 0.5 + 0.25 + 0.25$$
$$= 1$$

Which is to be expected. However, in FIG. 5, the quantum rules for the probability at "Bob's" detector 7 depend on "Alice's" measurement 2.

A Crucial Difference

Attention is now drawn to the subtle difference between concatenated beamsplitters and 3-way splitters or n-way splitters in general. Consider first a 2-way splitter as described by eqn. 21: one can see how the creation operator is mapped to the output ports; we can elaborate that to show that there is a phase factor (a delay) $e^{i\theta_{delay}}$ between the input and output operators to allow for wave propagation and time of response for the materials to re-emit photons:

$$\hat{a}_a^\dagger |0\rangle_a |0\rangle_b \rightarrow \frac{e^{i\theta_{delay}}}{\sqrt{2}}(\hat{a}_c^\dagger + i\hat{a}_d^\dagger)|0\rangle_c |0\rangle_d = \qquad \text{eqn. 26}$$

$$\frac{e^{i\theta_{delay}}}{\sqrt{2}}(|1\rangle_c |0\rangle_d + i|0\rangle_c |1\rangle_d)$$

As already mentioned, after measurement random phase factors will be introduced ("vacuum noise") into the non-entangled output states, which are either:

$$\frac{e^{i\theta_c(t)}}{\sqrt{2}}|1\rangle_c|0\rangle_d \text{ or } \frac{e^{i\theta_d(t)}}{\sqrt{2}}|0\rangle_c|1\rangle_d \qquad \text{eqn. 27}$$

But the difference in the phases will always be equal to the input-output delay:

$$\theta_{delay} = |\theta_c(t) - \theta_d(t)| \qquad \text{eqn. 28}$$

Consider now a 3-way splitter (with only one input port), as indicated in FIG. 5c, made from a source and 3 slits. The mapping function is:

$$\hat{a}_0^\dagger|0\rangle_0 \rightarrow \frac{e^{i\theta_{delay}}}{\sqrt{3}}(\hat{a}_a^\dagger + e^{i\theta_{ab}}\hat{a}_b^\dagger + e^{i\theta_{ac}}\hat{a}_c^\dagger)|0\rangle_a|0\rangle_b|0\rangle_c = \qquad \text{eqn. 29}$$

$$\frac{e^{i\theta_{delay}}}{\sqrt{3}}(|1\rangle_a|0\rangle_b|0\rangle_c + |0\rangle_a|1\rangle_b|0\rangle_c + |0\rangle_a|0\rangle_b|1\rangle_c)$$

(Clearly we show just the outputs normalised to each other and not to the source). The overall delay between input and output is once again $e^{i\theta_{delay}}$ and relative delays between the outputs (relative to port a) are $e^{i\theta_{ab}}$ and $e^{i\theta_{ac}}$.

Now upon measurement of one port, unlike the concatenated beamsplitters of FIG. 5a, the other two ports will still be entangled:

$$\frac{e^{i\theta_a(t)}}{\sqrt{3}}|1\rangle_a|0\rangle_b|0\rangle_c \text{ or} \qquad \text{eqn. 30}$$

$$\frac{e^{i\theta_{abc}(t)}}{\sqrt{3}}(|0\rangle_a|1\rangle_b|0\rangle_c + e^{i\theta_{bc}}|0\rangle_a|0\rangle_b|1\rangle_c)$$

Where random phases $e^{i\theta_a(t)}$ and $e^{i\theta_{abc}(t)}$ have been introduced to reflect the process of randomness from wavefunction collapse and vacuum noise, subject, once again to:

$$\theta_{delay} = |e^{i\theta_a(t)} - e^{i\theta_{abc}(t)}| \qquad \text{eqn. 31}$$

With a fixed relative phase between ports "b" and "c", $e^{i\theta_{bc}}$. This is consistent with the diagrams of FIG. 5b and the introduction of vacuum noise into the beamsplitter output upon measurement and how it become a particle splitter, though in this case with a 3-way splitter, a particle and entangled particle splitter.

So this begs the question: how is the concatenated, essentially 3-way splitter, of FIG. 5a (output ports "d", "g" and "h") different than the 3-way splitter of FIG. 5c or the general n-way splitter made from beamsplitters and phase plates of FIG. 5d? Why does measurement on one port of FIG. 5a render the other ports particle in nature ("distinguishable" paths) and not entangled, as FIGS. 5c and 5d?

The answer to this is that with the concatenated beamsplitter of FIG. 5a vacuum noise (FIG. 5b) is admitted at port "f" when a measurement is performed. This renders, upon measurement at port "g", the path to port "h" distinguishable. Therefore ports "d" and "h" won't be in entanglement superposition when "g" is measured. One can clearly see this doesn't occur in FIG. 5c when measurement on any one port is conducted, so the remaining paths are indistinguishable nor in FIG. 5d.

Distinguishable and Indistinguishable Paths with Concatenated Beamsplitters

Returning to our concatenated beamsplitters, measurement implies that the paths are distinguishable and this implies adding probabilities (for 50:50 beamsplitters, other ratios can lead to tunable probabilities), $$P(\text{Measurement, bit 1}) = \left|\frac{i}{\sqrt{2}}\right|^2 + \left|\frac{1}{\sqrt{4}}\right|^2 \qquad \text{eqn. 32}$$

$$= 0.5 + 0.25$$

$$= 0.75$$

No-measurement allows interference to occur by altering the path length, which is shown by the phase factor $e^{i\theta}$, $$P(\text{No-measurement, bit 0}) = \left|\frac{i}{\sqrt{2}}\right|^2 + \left|\frac{e^{i\theta}}{\sqrt{4}}\right|^2 + \qquad \text{eqn. 33}$$

$$2\left|\frac{i}{\sqrt{2}}\right|^2 \left|\frac{e^{i\theta}}{\sqrt{4}}\right|^2 \cos(\arg\theta)$$

$$= 0.5 + 0.25 + \frac{1}{\sqrt{2}}\cos(\arg\theta)$$

$$= 0.75 \pm 0.707\cos(\arg\theta)$$

$$= 0.043 \text{ minimum}$$

With regard to FIG. 5, a single source 9 of particles is used.

The particles are emitted along a first path, and respective first and second beamsplitters 10 are located along the path. In this example, both of the beamsplitters 10 are half-silvered mirrors (or other partially reflective mirrors, as discussed below) so that at each beamsplitter 10 the incident wavefunction is divided into two portions, a first portion corresponding to transmission through the beamsplitter 10, and a second portion corresponding to reflection by the beamsplitter 10.

The first portion of the wavefunction of a particle that is reflected by the first beamsplitter 10 travels to, or is directed to, a detector 7. The second portion of the wavefunction that is transmitted by the first beamsplitter 10 carries on and arrives at the second beamsplitter 10. Of the second portion of this wavefunction, a first portion is reflected by the second beamsplitter 10 and travels to, or is directed to, the detector 7. The second portion is transmitted through the second beamsplitter 10, and arrives (as with the previous example) at a filter 2, which can be arranged to be either on-path or off-path. Once again the filter 2 is preferably a blocking filter which absorbs all particles which impinge on it.

The components are arranged so that the distance from the particle source 9 to the filter 2 is less than the distance from the particle source 9 to the detector 7, whether through reflection by either the first or the second beamsplitter 10. Once again, here "distance" refers to optical path length.

It will be understood that, once again, by choosing whether the filter 2 is on-path or off-path, it is possible to control whether the wavefunctions that arrive at the detector 7 relate to particles that are in an indeterminate position, or relate to particles that are in a specific, determined position.

If the filter 2 is off-path, portions of the wavefunctions will arrive at the detector 7 from both the first and the second beamsplitters 10, relating to particles that are in an indeterminate position. The components are arranged so the two incoming portions of the wavefunction of a particle will interfere destructively with each other (e.g. the difference in the path lengths of the two portions of the wavefunction being different by half a wavelength of the particle, or by a number of whole wavelengths plus a half wavelength). In this case the rate of detection will depend on (inter alia) the transmission/reflection coefficients of the beamsplitters 10. The analysis above is presented on the basis of two 50:50 beamsplitters, in which case we may expect the two parts of the wavefunction not to cancel out entirely, as the amplitude of the portion of the wavefunction from the first beamsplitter will be greater than that from the second beamsplitter. By tuning the coefficients of the beamsplitters, complete or more complete cancellation may be achievable. For instance, transmission/reflection coefficients of 1:2 (i.e. one third of incident particles reflected) and 1:1 (i.e. one half of incident particles reflected) respectively for the first and second beamsplitters may lead to more complete cancellation. Under one communication protocol, the filter 2 being off-path represents the transmission of a binary zero.

By contrast, if the filter 2 is on-path, then when the portion of the wavefunction that has been transmitted by both beamsplitters 10 reaches the filter 2, the wavefunction will collapse and the particle will have a specific, determined position and path through the apparatus—either (a) reflected by the first beamsplitter 10, (b) reflected by the second beamsplitter 10, or (c) transmitted by both beamsplitters 10. For cases (a) and (b), the arrival of a photon will be detected by the detector 7. As discussed above, when the filter is on-path the rate of detection of photons by the detector 7 will be significantly (and detectably) higher than when the filter is off-path. Under one communication protocol, the filter 2 being on-path represents the transmission of a binary one.

By placing the filter 2 either on-path or off-path, therefore, Alice can control whether Bob detects a binary zero or a binary one.

In the above discussion, and in other discussions in this document, it is stated that (for example) beams reflected by a beamsplitter arrive at a detector, and beams transmitted by the beamsplitter arrive at a filter, In each case, this could be reversed, and there is no special relationship between transmission by a beamsplitter and filtering, or between reflection by a beamsplitter and filtering.

Figure 6:
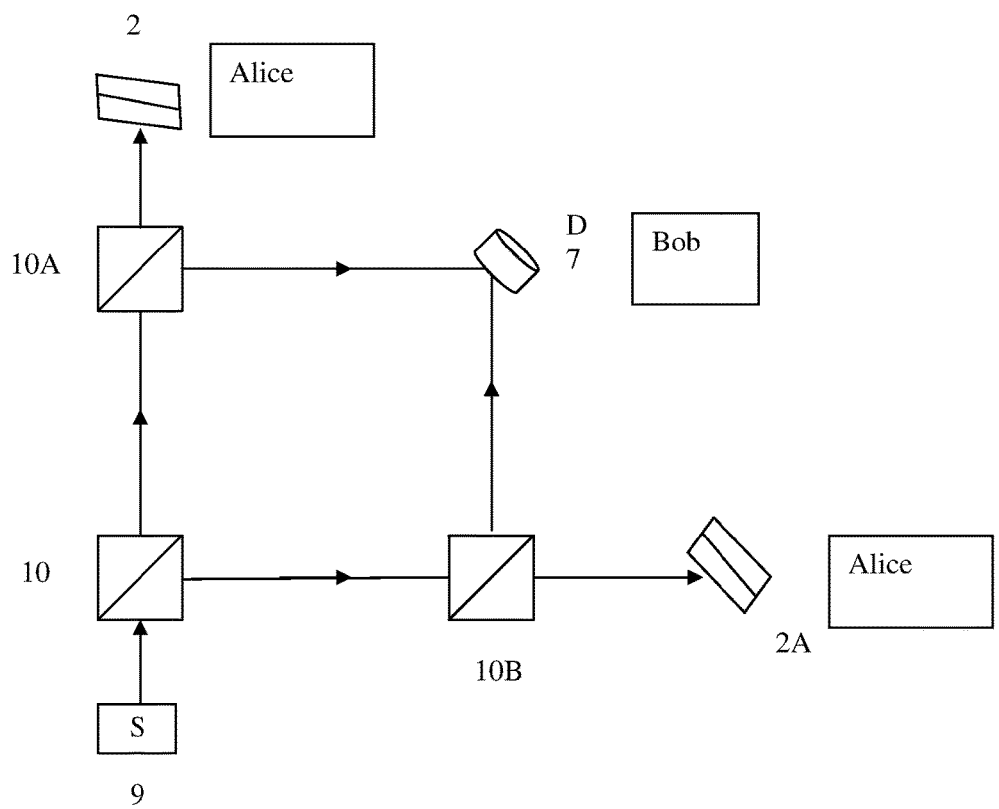
FIG. 6 shows another embodiment of the invention using one coherent source, three beamsplitters and two measuring gates.

FIG. 6 shows another embodiment of the invention using 50:50 beamsplitters. First the one source of non-entangled coherent 9 passes through a beamsplitter 10 to make two coherent beams at its output ports. The two beams then pass onto further beamsplitters 10A and 10B. Particles reflected by the further beamsplitters 10A, 10B converge on a detector 7, and are directed to arrive at the detector in an aligned or substantially aligned fashion, so that interference between these beams is possible. Particles transmitted by the further beamsplitters 10A, 10B arrive at respective first and second filters 2, 2A. Using the existing reasoning about measurement/non-measurement and non-entangled/entangled states, the outputs of the further beamsplitters 10A, 10B can be made coherent or mixed by interaction with the first or second filters 2, 2A. As with the system described above in relation to FIG. 5, blocking of the beam transmitted by either of the further beamsplitters 10A, 10B can lead to an increased rate of detection at the detector 7 (preferably signalling a binary one) compared to the situation where both of the filters 2 are off-path (which preferably signals a binary zero). Two measurements are shown via the first and second filters 2 and 2A though just one measurement would suffice. Having two measurements ensures a greater depth of modulation at the detector 7.

In this case, the no-measurement and measurement conditions are calculated thus:

$$P(\text{Measurement, bit 1}) = \left|\frac{i}{\sqrt{4}}\right|^2 + \left|\frac{i}{\sqrt{4}}\right|^2 \qquad \text{eqn. 34}$$
$$= 0.25 + 0.25$$
$$= 0.5$$

And $$P(\text{No-measurement, bit 0}) = \left|\frac{i}{\sqrt{4}}\right|^2 + \left|\frac{e^{i\theta}}{\sqrt{4}}\right|^2 + \qquad \text{eqn. 35}$$
$$2\left|\frac{i}{\sqrt{4}}\right|\left|\frac{e^{i\theta}}{\sqrt{4}}\right|\cos(\arg\theta)$$
$$= 0.25 + 0.25 + \frac{1}{\sqrt{4}}\cos(\arg\theta)$$
$$= 0.5 \pm 0.5\cos(\arg\theta)$$
$$= 0 \text{ minimum}$$

Figure 7:
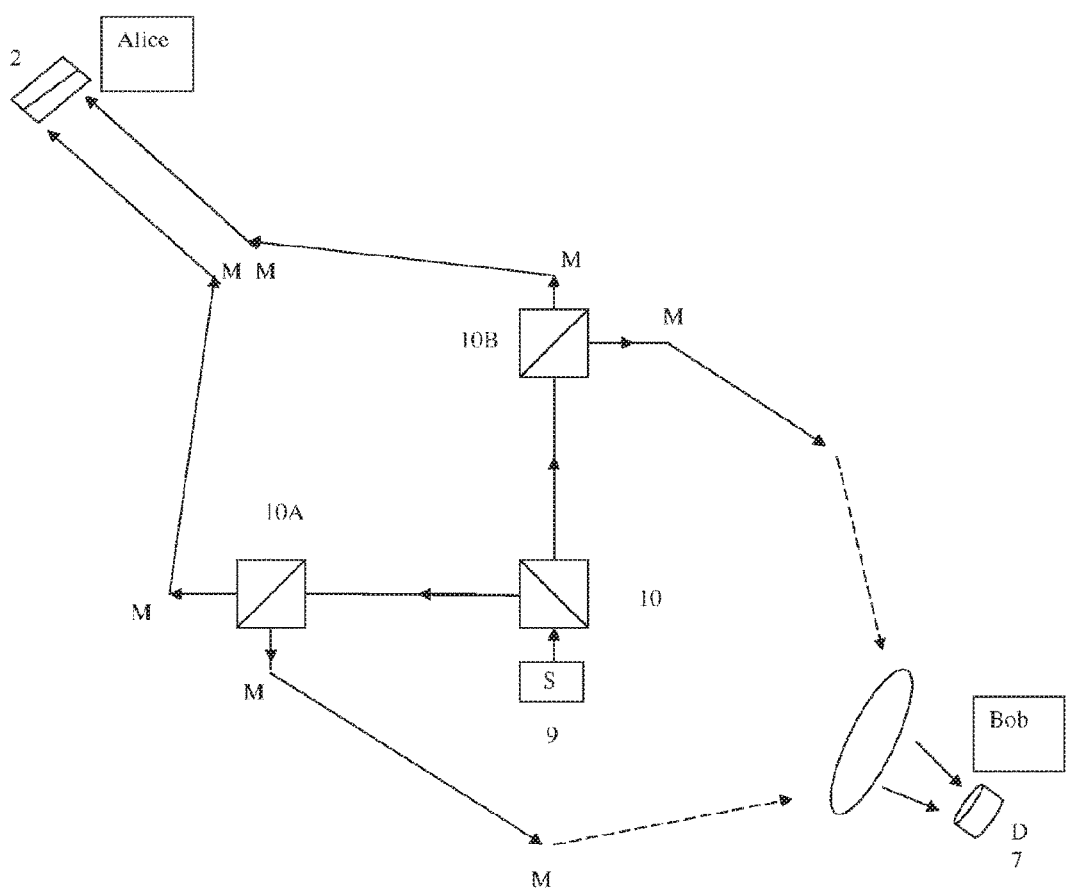
FIG. 7 shows a variation of FIG. 6, where the beams have been brought out in opposite directions.

FIG. 7 shows another embodiment of the invention which is a variation on the arrangement shown in FIG. 6. Once again particles emitted by a source 9 encounter an initial beamsplitter 10, and the beams exiting the initial beamsplitter 10 arrive at respective further beamsplitters 10A, 10B. However, one beam from each of the further beamsplitters 10A, 10B is directed (through the use of mirrors M, although any other suitable means may be used) to arrive at the same filter 2. The other beam exiting each further beamsplitter is directed to arrive at a detector 7. By placing the filter 2 on-path or off-path, a binary one or binary zero can again be transmitted to an observer at the detector. Again, by blocking/measuring two beams, a greater depth of modulation (and hence more reliable communication) can be achieved.

Figure 8:
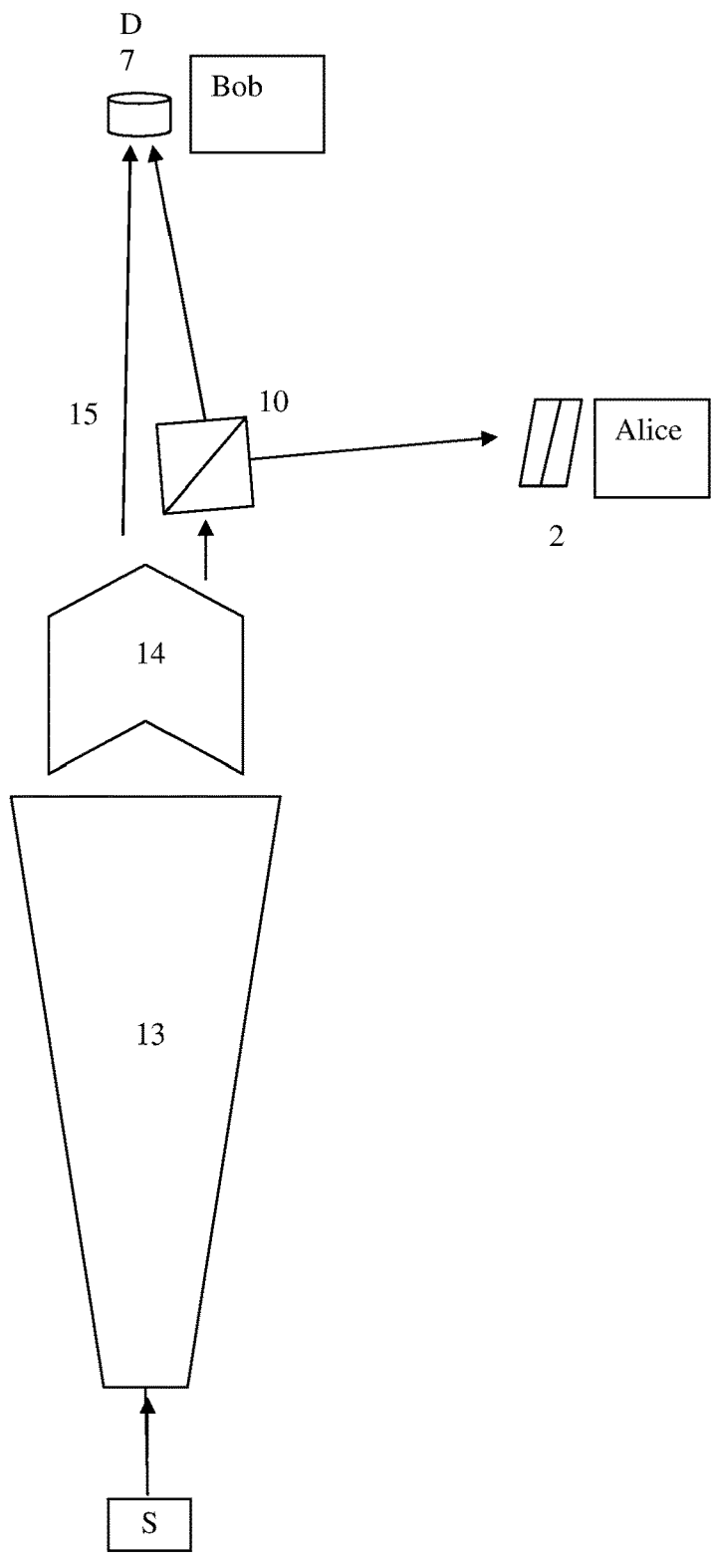
FIG. 8 shows a variation of FIG. 4 using just one source and a beam expander.

FIG. 8 shows another embodiment of the invention which is a variation on the arrangement shown in FIG. 4. A single coherent source 9 is used with a beam expander 13. The widened beam may be focused by a focusing component 14, and is then part incident on a beamsplitter 10. The other part 15 of the expanded beam passes the beam splitter 10 and along with the transmitted beam from the beamsplitter 10, both are incident on the detector 7 where they can interfere. The portion of the beam that is reflected by the beamsplitter 10 is directed to a filter 2.

The utility of this is to have just one coherent source 9, and not to have to lock two sources in phase coherence, as in FIG. 4. Once again "Alice" can use the measure/no-measure protocol via the filter 2 to signal a binary one or binary zero to the detector.

However, it is envisaged that in other embodiments, a plurality of coherent particle sources may be arranged so that they emit a combined beam having a width, part of which is (as in the example of FIG. 8) incident on a beamsplitter, and another part of which is directed to the detector without impinging on the beamsplitter. The other details of the setup would be as shown in FIG. 8, and the skilled reader will understand how this arrangement may be used to transmit information.

The sources in all the previous discussions and subsequent can be an array of single particle sources collimated to produce rectilinear beams. Typically when using photons, a laser source is attenuated from a Poissonian distribution of particles to a sub-Poissonian source such that it behaves a "particle gun". The detector benefits from being cryogenically cooled to limit the dark-current.

In use of the invention, it is expected that a communication protocol will be agreed between the operator of the filter ("Alice", in the above discussion) and the operator of the detector ("Bob", in the above discussion). The communication protocol will be used so that signals sent by Alice are correctly interpreted by Bob.

In some of the examples discussed above, when the filter is off-path, the rate of particles detected at the detector is lower than is the case when the filter is on-path. Placing the filter off-path is therefore a logical choice to represent binary zero, and placing the filter on-path in this protocol will represent binary one. However, there is no need for this to be the case and any other convention can be used.

Because of the statistical nature of quantum events, it is preferred to use a protocol in which a plurality of particles are received at the detector to represent one bit of information. If the receipt of only one particle was used to represent a bit of information, there would be a low signal to noise ratio, and communication is likely to be unreliable.

In the example discussed above in relation to FIG. 5, when the filter is on-path, there is a probability of 0.75 that a particle emitted by the information particle source will reach the detector. By contrast, when the filter is off-path, the probability of a particle emitted by the information particle source reaching the detector may be as low as 0.043. As on example of a communication protocol, particles could be emitted by the information particle source at a rate of 10 per second (on average). Bob could monitor the particles received by the detector over 2-second intervals. If Alice has placed the filter on-path, Bob could expect to receive around 15 particles over this time period. However, if Alice has placed the filter off-path, Bob could expect to receive only one particle, or possibly no particles, during this period.

Therefore, by counting the received particles at the detector over a period which covers the emission of a reasonable number of particles by the information particle source, the chance of statistical events resulting in mis-communication are small.

The above figures are given by way of example only. It is envisaged that a communication channel established in accordance with the invention may allow a very fast rate of transmission of bits of information.

Any suitable particles may be used with the invention, including both light or matter waves. Bosons or fermions may be used. In preferred embodiments, photons are used at the particles.

It will be appreciated that embodiments of the present invention provide communication apparatuses and methods that are robust and effective, and are more reliable and practical than those presented in PCT/GB05/004860.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

REFERENCES

1. Cornwall, R. O., *Secure Quantum Communication and Superluminal Signalling on the Bell Channel*. Infinite Energy, 2006. 69 see vixra.org abstracts
2. Cornwall. R. O., *A Means to Purify an Entangled Source*. 2014 see vixra.org abstracts
3. Hall, M. J. W., *Imprecise Measurements and Non-Locality in Quantum Mechanics. Physics Letters A*, 1987. 125(2, 3): p. 89,91.
4. Ghirardi, G. C. R., A.; Weber, T., *A General Argument against Superluminal Transmission through the Quantum Mechanical Measurement Process*. Lettere al Nuovo Cimento, 1980, 8 Mar. 27(10): p. 293-298.
5. Ghirardi, G. C. G., R; Rimini, A.; Weber, T., *Experiments of the EPR Type Involving CP-Violation do not allow Faster-than-Light Communications Between Distant Observers. Europhys. Lett.,* 1988. 6(2): p. 95-100.
6. Cornwall, R. O., *Is the Consequence of Superluminal Signalling to Physics Absolute Motion Through an Ether?* Infinite Energy, 2010. 98 see vixra.org abstracts
7. Cornwall, R. O., *A Mechanism for the effects of Relativity* 2014 see vixra.org abstracts
8. Cornwall, R. O., *Reply to Critique by Ghirardi of Entanglement Communication scheme by Cornwall.* 2015 see vixra.org abstracts
9. Cornwall, R. O., *How the Quantum no-Communication Theorem Misuses the Formalism and Loses Phase Information.* 2015 see vixra.org abstracts
10. Zurek, W. H., *Decoherence and the Transition from Quantum to Classical*. Los Alamos Science, 2002. 27.
11. Nielsen, M. C., Isaac, *Quantum Computation and Quantum Information*. 2000: Cambridge.
12. Audretsch, J., *Entangled Systems*. 2007: Wiley-VCH.
13. Dirac, P. A. M., *The Principles of Quantum Mechanics*. 4th ed. International Series of Monographs on Physics. 1996, Oxford: Clarendon Press.
14. Landau, L., *A Course in Theoretical Physics: Quantum Mechanics*. Vol. 3. 1982: Butterworth-Heinemann.

15. Aspect, A. G., P; Roger, G, *Experimental Realization of Einstein-Podolsky-Rosen-Bohm Gedankenexperiment: A New Violation of Bell's Inequalities*. Phys. Rev. Lett., 1982. 49(91).
16. C. H. Holbrow, E. G., M. E. Parks, *Photon quantum mechanics and beamsplitters*. Am. J. Phys., 2002. 70(3).
17. Gerry, C. K., Peter, *Introductory Quantum Optics*. 2004: CUP.

The invention claimed is:

1. An information transmission arrangement comprising:
   an information particle source, arranged to emit particles along a first path;
   a first beamsplitter, arranged on the first path, arranged to direct particles travelling along the first path along either a second path or a third path;
   a filter provided at a first location and selectively movable between an on-path position, wherein particles travelling along the second path will impinge on the filter, and an off-path position, wherein particle travelling along the second path will not impinge on the filter;
   a detection arrangement provided at a second location, wherein particles travelling along the third path will arrive at the second location; and
   a further source of particles arranged to direct particles to the second location, along a path that is different from the third path, such that particles travelling along the third path may interfere with particles from the further source of particles before arriving at the detector.

2. A transmission arrangement according to claim 1, wherein the further source of particles comprises particles from the information particle source.

3. A transmission arrangement according to claim 1, wherein the further source of particles comprises a source which is separate from the information particle source.

4. A transmission arrangement according to claim 1, wherein the particles emitted by the information particle source are light waves or matter waves.

5. A transmission arrangement according to claim 1, wherein the filter is configured either to block all particles that impinge thereon, or only to allow particles having a certain value of a parameter to pass therethrough.

6. A method of transmitting information, comprising the steps of:
   providing a transmission arrangement according to claim 1;
   generating particles using the information particle source;
   placing the filter in the second path to communicate a first signal;
   not placing the filter in the second path to communicate a second signal; and
   monitoring the arrival of particles at the detector to interpret the first and second signals.

7. A transmission arrangement according to claim 2, wherein the further source of particles comprises a further beamsplitter which is arranged so that particles emitted from the information particle source impinge on the further beamsplitter.

8. A transmission arrangement according to claim 2, comprising first and second further beamsplitters, arranged so that particles emerging from the first beamsplitter impinge on one of the first and second further beamsplitters, and wherein:
   at each of the further beamsplitters, some particles are directed to the detector;
   the particles that are directed to the detector by the first and second further beamsplitters may interfere with each other before arriving at the detector; and
   particles from at least one of the further beamsplitters that are not directed to the detector are directed to the filter.

9. A transmission arrangement according to claim 2, wherein the particles emitted from the information particle source form a beam having a width, and wherein the first beamsplitter is arranged to occupy only a part of the width.

10. A transmission arrangement according to claim 2, wherein the coherence length of the particles that are emitted by the information particle source is greater than the difference between the path length to the detector of the two beams of particles from the information particle source that arrive at the detector.

11. A transmission arrangement according to claim 3, wherein the particles that are emitted from the further source of particles are of the same type as the particles that are emitted by the information particle source, and are coherent therewith.

12. A transmission arrangement according to claim 4, wherein the particles emitted by the information particle source are bosons or fermions.

13. A method according to claim 6, wherein the first signal is one binary bit, and the second signal is the other binary bit.

14. A method according to claim 6, wherein the step of monitoring the arrival of particles at the detector comprises receiving a plurality of particles to comprise either the first signal or the second signal.

15. A method according to claim 6, wherein the step of monitoring the arrival of particles at the detector comprises receiving a single particle to comprise either the first signal or the second signal.

16. A method according to claim 6, comprising monitoring the arrival of particles at the detector over a series of agreed time slots, and wherein the number of particles that are detected as arriving at the detector during each time slot determines which of the first and the second signals are received.

17. A transmission arrangement according to claim 7, wherein particles emitted from the information particle source encounter the first beamsplitter before the further beamsplitter.

18. A transmission arrangement according to claim 8, wherein particles from the first and second further beamsplitters that are not directed to the detector are directed to respective first and second filters.

19. A transmission arrangement according to claim 9, wherein particles in the beam that do not impinge on the first beamsplitter are directed to arrive at the detector.

20. A transmission arrangement according to claim 9, wherein particles that impinge on the first beamsplitter are directed along two paths, one of which is directed to the filter, and the other of which is directed to the detector.

* * * * *